(12) United States Patent
Satoi

(10) Patent No.: US 10,883,530 B2
(45) Date of Patent: Jan. 5, 2021

(54) FASTENING STRUCTURE

(71) Applicant: TOYOTA JIDOSHA KABUSHIKI KAISHA, Toyota (JP)

(72) Inventor: Taisuke Satoi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 16/125,114

(22) Filed: Sep. 7, 2018

(65) Prior Publication Data
US 2019/0107140 A1    Apr. 11, 2019

(30) Foreign Application Priority Data

Oct. 11, 2017   (JP) ................................. 2017-197977

(51) Int. Cl.
| F16B 37/04 | (2006.01) |
| F16B 35/04 | (2006.01) |
| F16B 5/02 | (2006.01) |
| F16B 39/282 | (2006.01) |
| F16B 5/06 | (2006.01) |
| B23P 19/06 | (2006.01) |

(52) U.S. Cl.
CPC .............. *F16B 37/044* (2013.01); *F16B 5/02* (2013.01); *F16B 35/044* (2013.01); *F16B 39/282* (2013.01); *B23P 19/06* (2013.01); *F16B 5/0657* (2013.01); *F16B 37/04* (2013.01)

(58) Field of Classification Search
CPC ........ F16B 5/02; F16B 5/0208; F16B 5/0657; F16B 35/044; F16B 37/04; F16B 37/044; F16B 39/10; F16B 39/24; F16B 39/282; F16B 43/00; B23P 19/06

USPC .......................... 411/103, 104, 105, 383, 432
See application file for complete search history.

(56) References Cited

U.S. PATENT DOCUMENTS

| 3,782,056 A * | 1/1974 | Osteen ................ F16B 25/0031 |
| | | 403/11 |
| 6,595,732 B2 * | 7/2003 | Werner .................... F16B 39/08 |
| | | 411/104 |
| 6,796,760 B1 * | 9/2004 | Tanner .................. F16B 41/002 |
| | | 411/104 |
| 6,811,363 B1 * | 11/2004 | Minnich ............... F16B 37/044 |
| | | 411/104 |
| 7,927,050 B2 * | 4/2011 | Koike ................... F16B 21/086 |
| | | 411/104 |

(Continued)

FOREIGN PATENT DOCUMENTS

| JP | 2000-297810 A | 10/2000 |
| JP | 2004-022938 A | 1/2004 |
| JP | 2017-040347 A | 2/2017 |

*Primary Examiner* — Roberta S Delisle
(74) *Attorney, Agent, or Firm* — Oliff PLC

(57) ABSTRACT

In a fastening structure for fastening a member to be fastened to a target member by use of a fastening bolt and a nut, the target member has a nut pocket that communicates with a second fastening hole, at least one of a distal end of a male screw part of the fastening bolt and a proximal end of a female screw part is formed with a tapered surface that guides the nut to a coaxial position with the fastening bolt, the nut pocket is formed with abutting surfaces that is gradient surfaces which abut a part of the nut, and the nut is formed with surfaces to be abutted that abut on the abutting surfaces, and are gradient surfaces substantially parallel to the abutting surfaces.

8 Claims, 8 Drawing Sheets

(56) References Cited

U.S. PATENT DOCUMENTS

| | | | | |
|---|---|---|---|---|
| 8,985,924 B2* | 3/2015 | Nakamura | ......... | B60N 2/42709 |
| | | | | 411/104 |
| 2008/0181745 A1* | 7/2008 | Naik | ....................... | F16B 21/09 |
| | | | | 411/107 |
| 2014/0191526 A1* | 7/2014 | Lauxen | ................ | F16B 5/0657 |
| | | | | 296/1.08 |
| 2015/0369273 A1* | 12/2015 | Saitou | ................... | F16B 37/041 |
| | | | | 411/173 |

* cited by examiner

FASTENING STRUCTURE

CROSS REFERENCE TO RELATED APPLICATION

The entire disclosure of Japanese Patent Application No. 2017-197977 filed on Oct. 11, 2017 including the specification, claims, drawings, and abstract is incorporated herein by reference in its entirety.

TECHNICAL FIELD

This specification relates to a fastening structure for fastening a member to be fastened to a target member by use of a fastening bolt and a nut.

BACKGROUND

Conventionally, techniques of fastening a member to be fastened and a target member to each other by use of a fastening bolt and a nut are widely known. Of such fastening techniques, there is a technique of previously fixing a nut to a target member or a member to be fastened in order to attain fastening by rotating a fastening bolt.

As a method for fixing a nut to a target member or a member to be fastened, for example, welding is employed. However, in a case where a nut, and a target member or a member to be fastened are made of different kinds of materials, it is difficult to weld the two.

Therefore, there are proposed some technologies of restricting rotation of a nut by not welding the nut to the target member, but forming, in a target member, a space for housing the nut, and housing the nut in this space. For example, JP 2017-040347 A discloses a nut mounting structure having a nut that has a substantially rectangular shape as viewed in the axial direction, a member to be mounted (target member) that is formed with a pair of rib walls protruding so as to have this nut therebetween, and a bolt insertion hole, and a case member that covers other surface of the nut disposed between the rib walls. According to such a nut mounting structure, rotation of the nut is restricted due to abutting relation with the rib walls. Therefore, a fastening bolt screwed with the nut is rotated, so that the fastening bolt can be fastened.

Herein, slight gaps are needed between the nut and the rib walls, and between the nut and the case member due to assembly. While such gaps facilitate assembling, position displacement or a defect of posture of the nut is likely to be caused. Particularly, when the nut falls down toward the case member, and the axial direction of the nut is inclined to the axial direction of the bolt, the nut cannot be suitably screwed to the bolt. In the technique of JP 2017-040347 A, the nut is in the closed space covered by the rib walls and the case member, and therefore it is difficult to correct the position displacement or the defect of posture of the nut. That is, in the conventional technique, workability at the time of screwing the fastening bolt to the screw is deteriorated.

This specification discloses a fastening structure capable of further improving workability at the time of screwing a fastening bolt to a screw.

SUMMARY OF THE INVENTION

A fastening structure disclosed in this specification is a fastening structure for fastening a member to be fastened to a target member by use of a fastening bolt and a nut, the fastening structure comprising: the member to be fastened; the target member; the fastening bolt; and the nut, wherein the member to be fastened has a first fastening hole that penetrates in a prescribed axial direction so as to allow the fastening bolt to be inserted, the target member has a second fastening hole that penetrates in the axial direction so as to allow the fastening bolt to be inserted, and a nut pocket that communicates with the second fastening hole, and has an open end in a first direction substantially orthogonal to the axial direction and directing upward, the member to be fastened is fastened to the target member by insertion of the fastening bolt into the first and second fastening holes, and screwing and tightening of the nut housed in the nut pocket, at least one of a distal end part of a male screw part of the fastening bolt, and a proximal end part of a female screw part of the nut are formed with a tapered surface that guides the nut to a coaxial position with the fastening bolt, the nut pocket is formed with: a rotation restricting part that restricts rotation of the nut around the axis while allowing movement of the nut in the first direction by engagement with a part of the nut; and an abutting surface that is an abutting surface which abuts on other part of the nut, and is a gradient surface which proceeds in the axial direction as well as in the first direction, and the nut is formed with: a female screw part that is screwed to the fastening bolt; a restricted part that engages with the rotation restricting part; and a surface to be abutted that abuts on the abutting surface, and is a gradient surface substantially parallel to the abutting surface.

In a case of such a configuration, force of pressing the nut in the axial direction by the fastening bolt is likely to be converted into force of moving along the surface of the target member due to the abutting relation of the tapered surface or the abutting surface and the surface to be abutted. As a result, the nut is likely to move to the coaxial position with the fastening bolt, and fastening work is facilitated. Additionally, since the opening formed in the end in the first direction in the nut pocket is directed upward, the nut can be easily dropped to the bottom surface of the nut pocket, and therefore fastening work can be further facilitated. The expression "substantially orthogonal" in this case includes not only, of course, a completely orthogonal state but also a state with a slight error (for example, ±10 degrees). Therefore, a state inclined with respect to the axial direction by 80 degrees or 100 degrees can be also regarded as "substantially orthogonal". Additionally, "substantially parallel" includes not only, of course, a completely parallel state but also a state with a slight error (for example, ±10 degrees). Therefore, a state inclined to the abutting surface by ±10 degrees can be also regarded as "substantially parallel".

The nut and the target member do not need to be welded, and therefore the nut may be made of a material of a kind different from the target member.

According to the fastening structure disclosed in this specification, the nut and the target member may be made of different kinds of materials from each other. Consequently, various members can be fastened to each other.

The nut may have a 180-degree rotationally symmetric shape with a central axis of the nut as a center.

With such a configuration, a worker does not need to confirm a top and a bottom of the nut, and therefore fastening work can be further facilitated.

The nut pocket may have a back wall facing a base part formed with the second fastening hole, and the back wall may be formed with a back opening that is a hole or a cutout communicated with an internal space of the nut pocket.

The back wall has the back opening, so that liquid that enters the nut pocket can be discharged to the outside. Additionally, the back opening is provided, so that it is possible to get access to the nut inserted in the nut pocket, or foreign matter. As a result, the removal of a nut that has been inserted, the adjustment of the posture of the nut, the removal of foreign matter in the nut pocket or the like is enabled.

The back opening may extend up to the bottom surface of the nut pocket.

With such a configuration, liquid that enters the nut pocket can be more reliably discharged.

The nut may have a body part having a constant width in a second direction orthogonal to the first direction and the axial direction, and having both end surfaces in the second direction each functioning as the restricted part, and the back opening may have a width in the second direction that is almost the same as, or slightly larger than, the body part, and may function as the rotation restricting part.

In the case of such a configuration, force from the rotation restricting part can be received by the end surface of the body part having relatively high rigidity, and therefore it is possible to effectively prevent deformation of the nut or the like.

A surface facing the base part in the back wall of the nut pocket may be a gradient surface having a distance to the base part which increases toward the end in the first direction, and may function as the abutting surface, and a part of a distal end surface of the nut may be a gradient surface having a distance to the base part which increases toward the end in the first direction, and may function as the surface to be abutted.

With such a configuration, the fastening bolt can convert force of pressing the nut in the axial direction into force causing movement along a surface of the target member.

According to the fastening structure disclosed in this specification, force of pressing the nut in the axial direction by the fastening bolt is likely to be converted into force of moving along the surface of the target member due to the abutting relation of the tapered surface or the abutting surface and the surface to be abutted. As a result, the nut is likely to move to the coaxial position with the fastening bolt, and fastening work is facilitated. As a result, it is possible to further improve workability when the fastening bolt is screwed in the nut.

BRIEF DESCRIPTION OF DRAWINGS

Embodiments of the present disclosure will be described based on the following figures, wherein.

DESCRIPTION OF EMBODIMENTS

Figure 1:
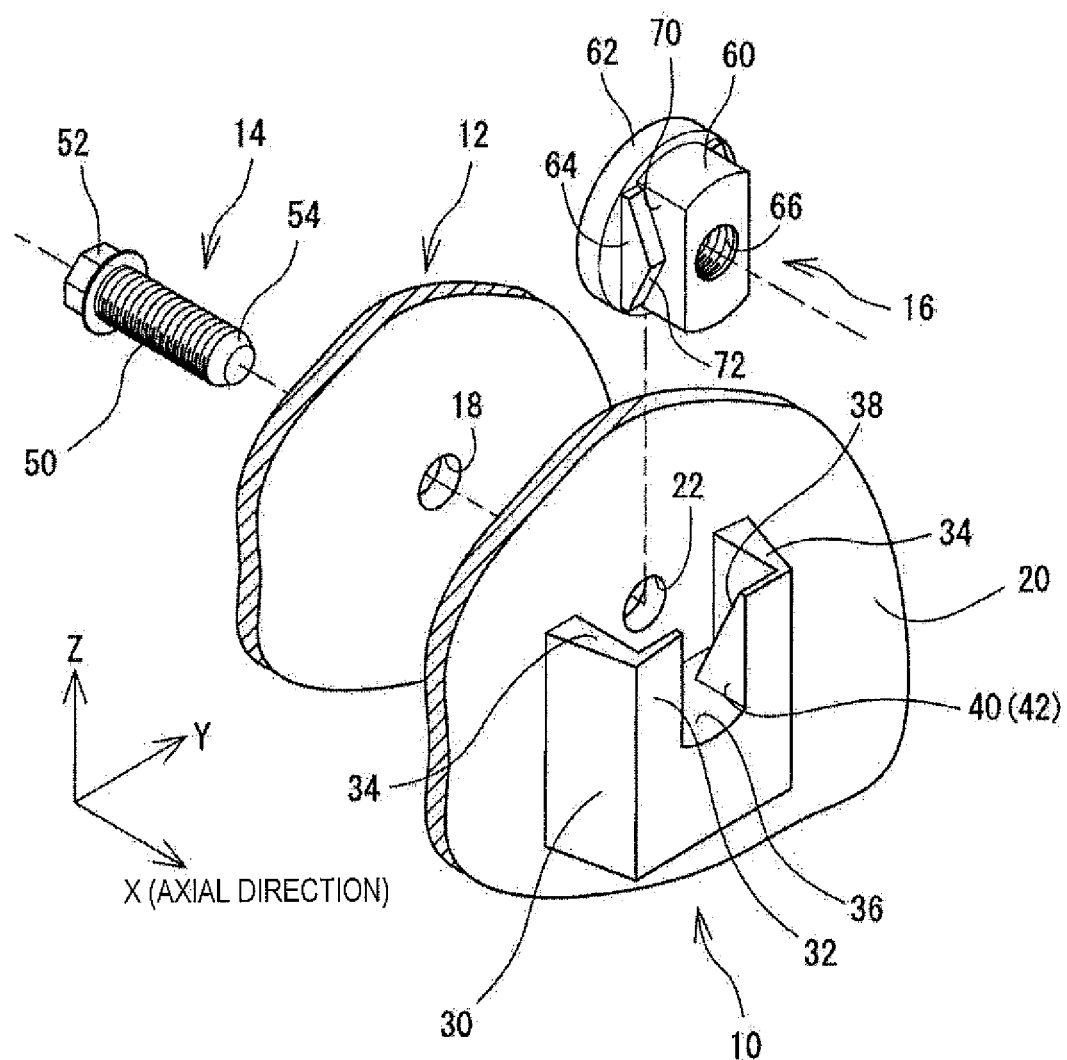
FIG. 1 is an exploded perspective view illustrating a state in which a member to be fastened is fastened to a target member by a fastening bolt and a nut.
Figure 2:
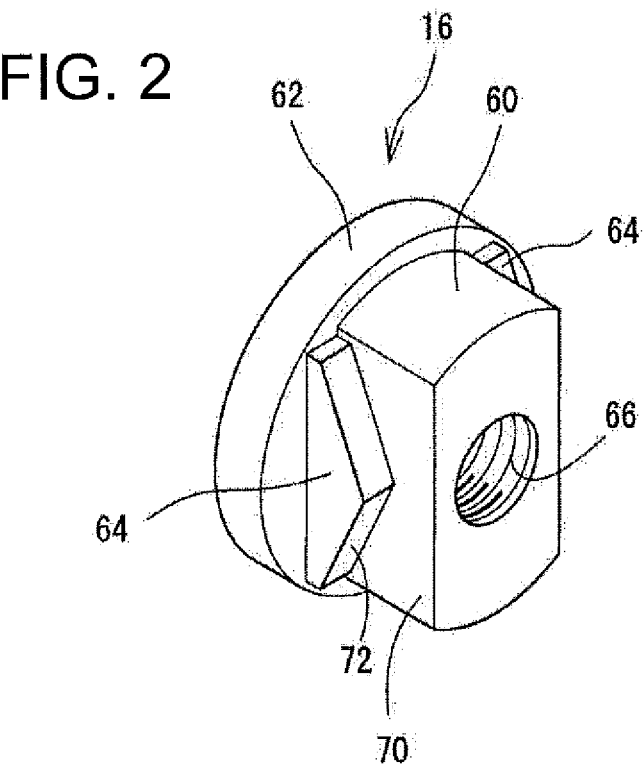
FIG. 2 is a perspective view of the nut.
Figure 3:
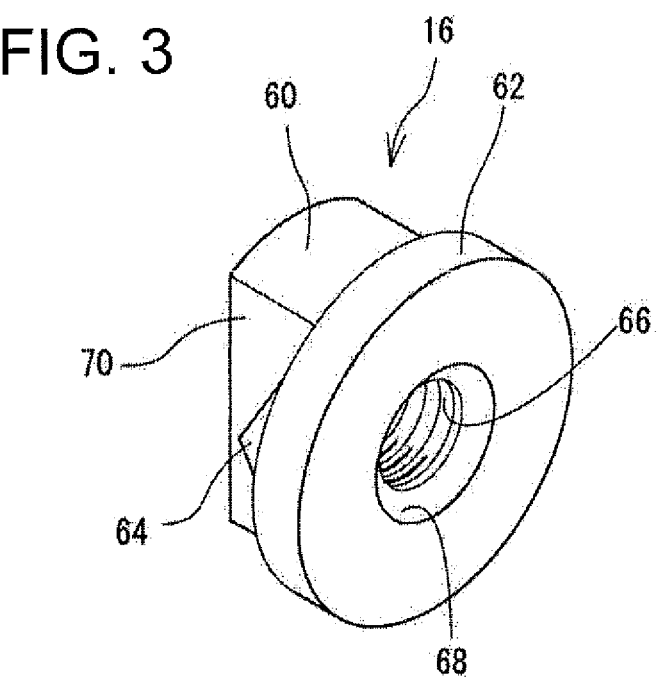
FIG. 3 is a perspective view of the nut as viewed from a different direction from FIG. 2.
Figure 4:
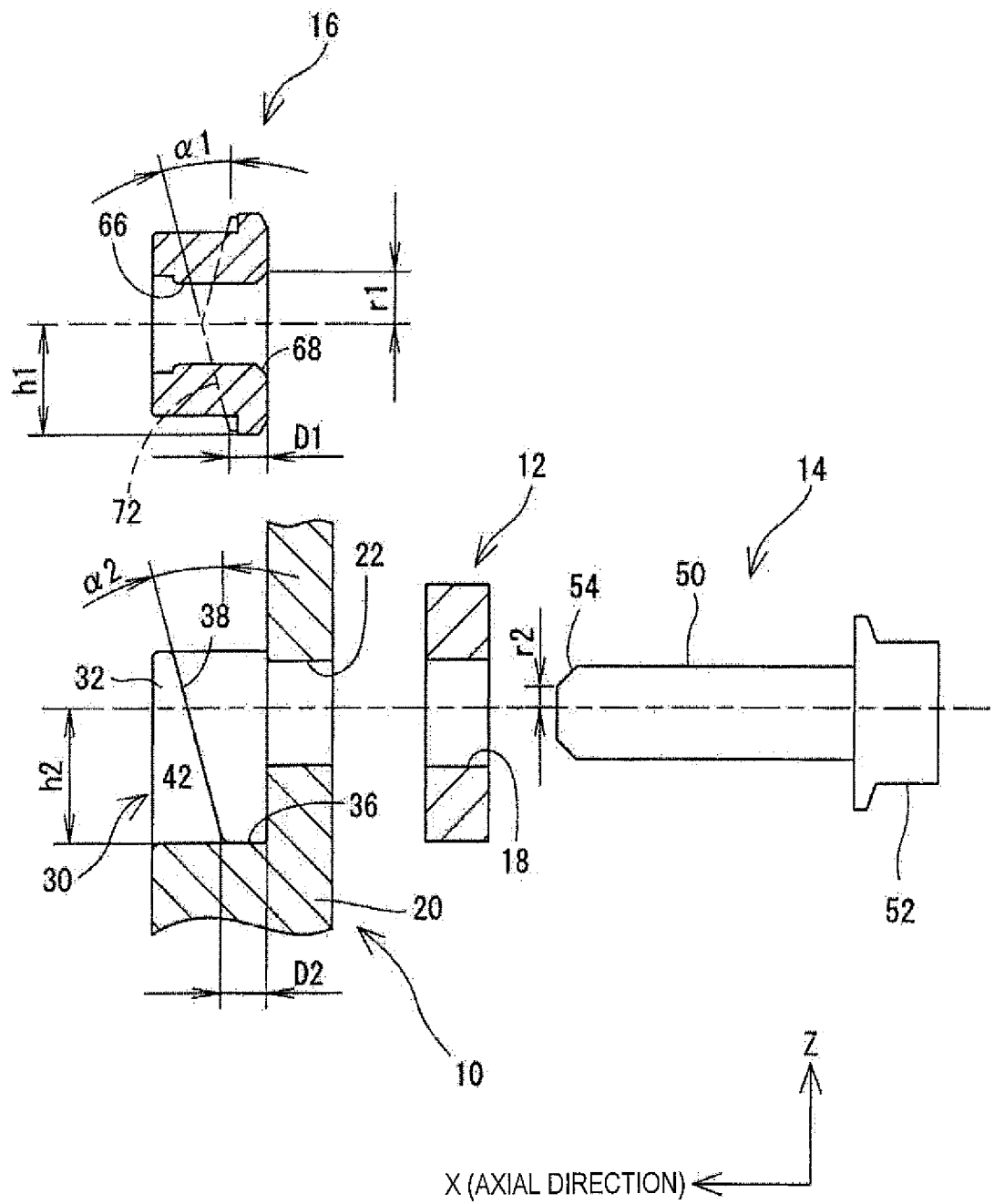
FIG. 4 is an exploded longitudinal sectional view of a member used in a fastening structure.

Hereinafter, a fastening structure will be described with reference to the drawings. FIG. 1 is an exploded perspective view illustrating a fastening state. Additionally, FIG. 2 and FIG. 3 are each a perspective view of a nut 16 used in the fastening structure. Furthermore, FIG. 4 is an exploded longitudinal sectional view of respective members. In the following description, the axial direction of a fastening bolt 14 and the nut 16 suitably fastened to each other is referred to as the "X direction" or the "axial direction", and the respective two directions perpendicular to the X direction are referred to as the "Y direction" and the "Z direction".

In this fastening structure, a member 12 to be fastened is screwed and fastened to a target member 10 by use of the fastening bolt 14 and the nut 16. The target member 10 and the nut 16 can be made of different kinds of materials from each other, particularly materials which are difficult to weld to each other. For example, the target member 10 is a suspension tower for a vehicle made of an aluminum material, and the nut 16 is made of an iron material. As another example, the nut 16 may be made of an iron material, and the target member 10 may be made of a resin material, carbon fiber, a titanium material, or the like. In some cases, the target member 10 and the nut 16 may be made of the same material.

The member 12 to be fastened is formed with a first fastening hole 18 that penetrates in the X direction (axial direction) so as to allow the fastening bolt 14 to be inserted. The inner diameter of this first fastening hole 18 is larger than the diameter of a male screw part 50 of the fastening bolt 14, and smaller than the diameter of a head 52 of the fastening bolt 14.

The target member 10 has a base part 20, and a nut pocket 30 formed to protrude from the base part 20. The base part 20 and the nut pocket 30 may be integrally molded, or the two may be formed as different separate members, and thereafter fixed to each other by a method such as welding. The base part 20 is formed with a second fastening hole 22 that penetrates in the X direction so as to allow the fastening bolt 14 to be inserted. The inner diameter of this second fastening hole 22 is larger than the diameter of the male screw part 50 of the fastening bolt 14, and is smaller than the diameter of a flange part 62 of the nut 16.

The nut pocket 30 protrudes from a surface of the base part 20, the surface being located on a side opposite to a contact surface with the member 12 to be fastened. This nut pocket 30 is a substantially box shaped portion having an open end in the Z direction (first direction). An inner part of the nut pocket 30 is a housing space in which the nut 16 is housed, and this housing space communicates with the second fastening hole 22. An opening formed in the end in the Z direction becomes an insertion opening that receives insertion of the nut 16. A forming position of this insertion opening is not particularly limited, but the insertion opening is preferably located on an upper side in the gravity direction with respect to a bottom surface 36 of the nut pocket 30. With such a configuration, the nut 16 loaded from the insertion opening can automatically enter to reach the deep side of the nut pocket 30 by gravity, and fastening work can be simplified.

The nut pocket 30 has a back wall 32 facing the base part 20, a pair of side walls 34 extending from both ends in the Y direction (second direction) of the back wall 32 toward the base part 20, and a bottom surface 36. Surfaces facing the base part 20 in the back wall 32 are each a gradient surface inclined such that a distance to the base part 20 increases toward the end in the Z direction (insertion opening). These gradient surfaces function as abutting surfaces 38 that abut on surfaces 72 to be abutted on the nut 16. However, this will be described in detail below. The back wall 32 is provided with a back opening 40 formed by a substantially rectangular cutout extending from the end in the Z direction to the other end (bottom surface 36). Peripheral surfaces of the two ends in the Y direction of this back opening 40 engage with restricted parts 70 of the nut 16, so that the peripheral surfaces function as the rotation restricting parts 42 that restrict rotation of the nut 16 around the axial direction while allowing movement in the Z direction of the nut 16. This will be also described later.

The fastening bolt 14 is roughly classified into the male screw part 50, and the head 52 provided in a proximal end of the male screw part 50. A distal end of the male screw part 50 is formed with a bolt-side tapered surface 54 having a diameter that decreases toward the distal end. This bolt-side tapered surface 54 guides the nut 16 to a coaxial position with the fastening bolt 14.

The nut 16 has a substantially rectangular parallelepiped body part 60, a flange part 62 provided in a proximal end of the body part 60, and a pair of side parts 64 provided in both sides in the Y direction of the body part 60. The body part 60 has a substantially block shape having a constant width in the Y direction. The width in the Y direction of this body part 60 is slightly smaller than the width in the Y direction of the back opening 40. When the nut 16 is housed in the nut pocket 30, a part of this body part 60 is fitted into the back opening 40. Both end surfaces in the Y direction of this body part 60 engage with the rotation restricting parts 42 of the nut pocket 30, so that the two end surfaces function as the restricted parts 70 that restrict the rotation of the nut 16 around the axial direction. That is, when a part of the body part 60 is fitted into the back opening 40, the restricted parts 70 of the nut 16 closely face the rotation restricting parts 42. Even when the nut 16 rotates around the axis, the rotation is restricted by an abutting relation with the rotation restricting parts 42.

The proximal end of the body part 60 is formed with the substantially disc-like flange part 62. A female screw part 66 that penetrates the flange part 62 and the body part 60 in the axial direction is formed at the center of the nut 16. The female screw part 66 is screwed with the male screw part 50 of the fastening bolt 14. A proximal end part of the female screw part 66 is formed with a nut-side tapered surface 68 having a diameter which increases toward a proximal end. This nut-side tapered surface 68 abuts on the bolt-side tapered surface 54, so that force in the axial direction is converted into force that moves along a surface of the target member 10, and the nut 16 is guided to the coaxial position with the fastening bolt 14.

The side parts 64 are portions that jut up from a back surface of the flange part 62 in substantially crest shapes. Distal end surfaces in the axial direction of these side parts 64 are gradient surfaces that separate from the flange part 62 toward the center in the Z direction. The gradient surfaces function as the surfaces 72 to be abutted that abut on the abutting surfaces 38 of the nut pocket 30. The nut 16 has a 180-degree rotationally symmetric shape. With such a configuration, even when the nut 16 is loaded upside down, the nut 16 can be suitably screwed. In other words, a worker can load the nut 16 in the nut pocket 30 without caring about a top and a bottom of the nut 16, which therefore further facilitates fastening work.

As illustrated in FIG. 4, the gradient angle α1 of each surface 72 to be abutted is almost the same as the gradient angle α2 of each abutting surface 38. However, realistically, the two gradient angles α1, α2 cannot be made completely the same, and therefore the gradient angle α1 is generally made slightly smaller than the gradient angle α2.

In order to cause the nut 16 to enter to reach a bottom of the nut pocket 30, the thickness D1 of a bottom of the nut 16 is the same as or slightly larger than the thickness D2 of the bottom of the nut pocket 30. Furthermore, in order to cause the center axis of the nut 16 to be closer to the bottom than the center axis of the second fastening hole 22 when the nut 16 is loaded in the nut pocket 30, a distance h2 from a bottom surface of the nut pocket 30 to the center axis of the second fastening hole 22 is larger than a distance h1 from a bottom surface of the nut 16 to the center axis (h2>h1). However, in order to generate interference of the nut-side tapered surface 68 with the bolt-side tapered surface 54, a difference between the distance h2 and the distance h1 (h2−h1) is preferably not more than a difference between the maximum radius r1 of the nut-side tapered surface 68 and the minimum radius r2 of the bolt-side tapered surface 54 (r1−r2). Therefore, h1<h2≤h1+r1−r2 is preferably satisfied.

Now, a state in which the member 12 to be fastened is fastened to the target member 10 by use of the above configuration will be described with reference to FIG. 5 to FIG. 7. In a case where the member 12 to be fastened is fastened to the target member 10, the nut 16 is previously housed in the housing space of the nut pocket 30. At this time, the body part 60 is fitted into the back opening 40.

Figure 5:
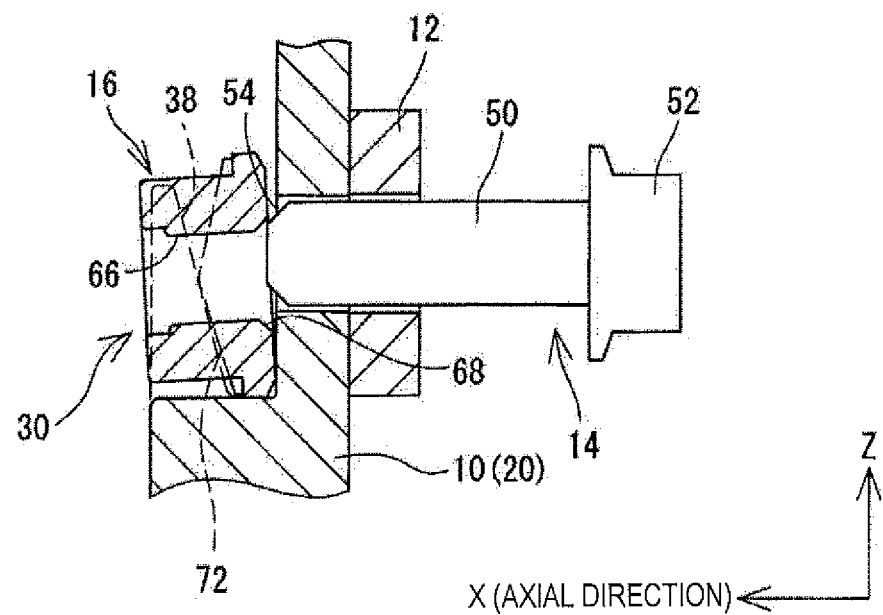
FIG. 5 is a longitudinal sectional view illustrating a fastening state.

As already described, the distance h2 from the bottom surface of the nut pocket 30 to the center axis of the second fastening hole 22 is larger than the distance h1 from the bottom surface of the nut 16 to the center axis of the nut 16 as illustrated in FIG. 5. Therefore, when the nut 16 is loaded in the nut pocket 30, the center axis of the nut 16 is deviated with respect to the center axis of the second fastening hole 22, and the center axis of the fastening bolt 14 inserted into the second fastening hole 22. The thickness D2 of the bottom of the nut pocket 30 is larger than the thickness D1 of the bottom of the nut 16. Therefore, the nut 16 can be slightly inclined in the nut pocket 30, and the center axis of the nut 16 can be inclined to the center axis of the second fastening hole 22. However, the abutting surfaces 38 and the surfaces 72 to be abutted closely face each other, and therefore the inclination angle of this nut 16 is relatively small.

Figure 6:
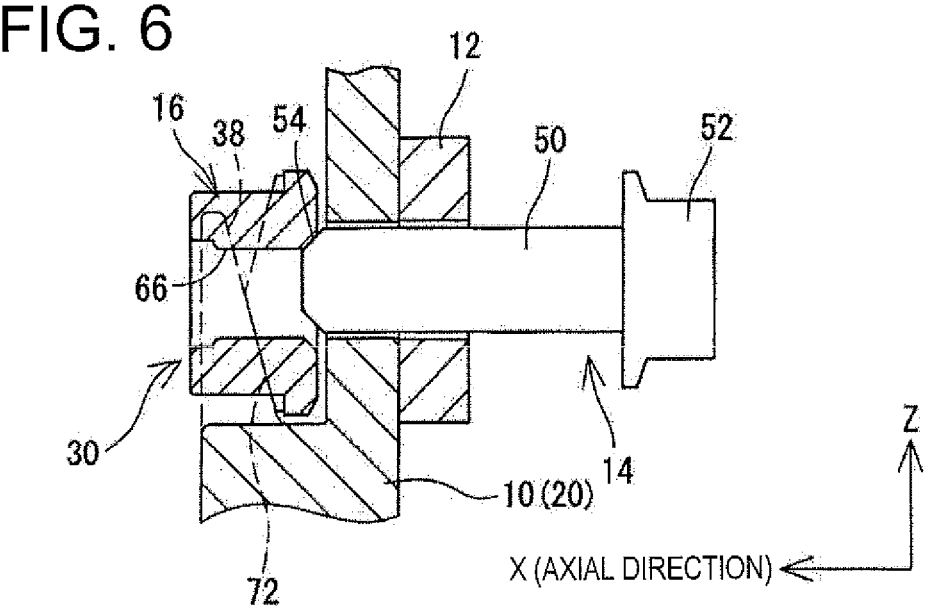
FIG. 6 is a longitudinal sectional view illustrating a fastening state.
Figure 7:
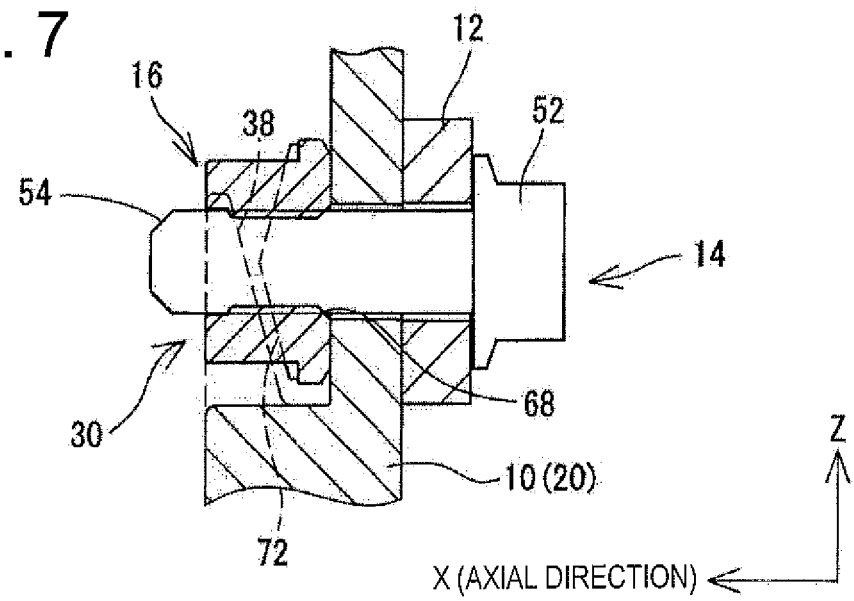
FIG. 7 is longitudinal sectional view illustrating a fastening state.

In this state, the male screw part 50 of the fastening bolt 14 is inserted into the first fastening hole 18 and the second fastening hole 22, as illustrated in FIG. 6. At this time, the diameter of the distal end of the male screw part 50 is sufficiently smaller than the diameter of the proximal end of the female screw part 66, and therefore the male screw part 50 is easily guided into the female screw part 66. Additionally, the bolt-side tapered surface 54 abuts on the nut-side tapered surface 68, so that force of pressing the nut 16 in the axial direction by the fastening bolt 14 is converted into obliquely upward force parallel to the tapered surfaces 54, 68. As a result, the nut 16 moves upward, that is, the center axis of the nut 16 moves in the direction of approaching the center axis of the bolt.

Furthermore, at this time, the surfaces 72 to be abutted of the nut 16 are pressed against the abutting surfaces 38 of the nut pocket 30 by the force of pressing the nut 16 by the fastening bolt 14. When the whole of the surfaces 72 to be abutted of the nut 16 receive this pressing force to abut on the abutting surfaces 38 of the nut pocket 30, the inclination of the nut 16 is eliminated, and the center axis of the nut 16 becomes parallel to the center axis of the fastening bolt 14.

At this time, force of pressing against the abutting surfaces 38 is converted into force in the direction along the abutting surfaces 38, that is, an obliquely upward force. As a result, upward movement of the nut 16, and movement of the center axis of the nut 16 in the direction approaching the center axis of the fastening bolt 14, more reliably occur. Then, when the axis of the nut 16 and the axis of the fastening bolt 14 finally coincide with each other, a thread of the fastening bolt 14 and a thread of the nut 16 engage with each other, and the two can be suitably screwed with each other.

When the thread of the fastening bolt 14 and the thread of the nut 16 start meshing with each other, a worker rotates the fastening bolt 14 in the prescribed screwing direction. With the rotation of this fastening bolt 14, the nut 16 screwed with the fastening bolt 14 also tries to rotate along with the fastening bolt 14. However, due to relation of engagement of the restricted parts 70 of the nut 16 and the rotation restricting parts 42 of the nut pocket 30, the nut 16 cannot rotate around the axis. As a result, the fastening bolt 14 is rotated, so that relative rotation of the fastening bolt 14 and the nut 16 is generated, and the screw fastening of the fastening bolt 14 proceeds. Finally as illustrated in FIG. 7, the base part 20 of the target member 10, and the member 12 to be fastened are sandwiched between the head 52 of the fastening bolt 14, and the nut 16, and the member 12 to be fastened is fastened to the target member 10.

As is clear from the above description, in the fastening structure disclosed in this specification, the nut 16 and the nut pocket 30 are provided with the gradient surfaces closely facing each other, that is, the surfaces 72 to be abutted and the abutting surfaces 38. The reasons why such surfaces 72 to be abutted and abutting surfaces 38 are provided will be described with reference to FIG. 12 and FIG. 13.

Figure 12:
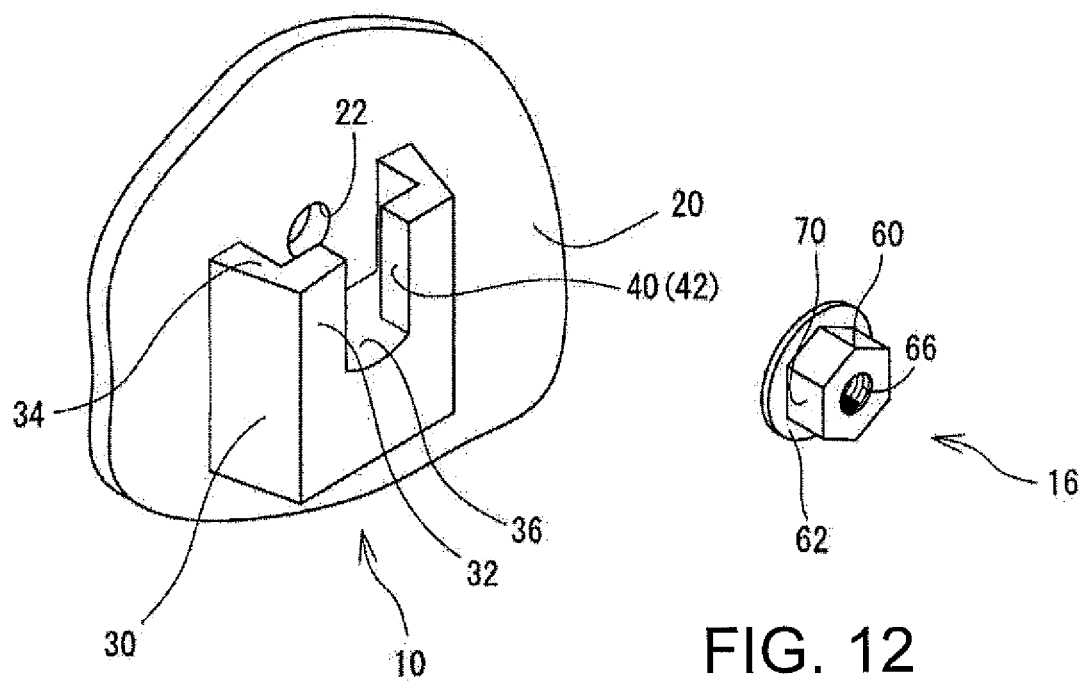
FIG. 12 is a diagram illustrating an example of another fastening structure.
Figure 13:
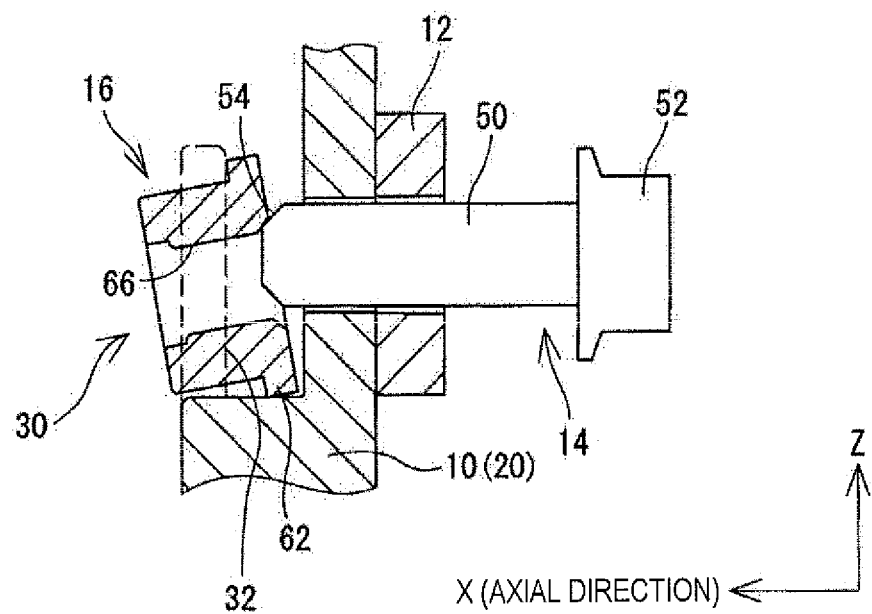
FIG. 13 is a longitudinal sectional view of the fastening structure of FIG. 12.

FIG. 12 is a diagram illustrating an example of a nut pocket 30 and a nut 16 that do not have any gradient surface. FIG. 13 is a longitudinal sectional view at the time the nut 16 is housed in the nut pocket 30 illustrated in FIG. 12. As illustrated in FIG. 12, in this example, the nut 16 has a substantially circular flange part 62 at a proximal end of a substantially hexagonal cylindrical body part 60, and this nut 16 is generally referred to as a flanged hexagonal nut. The nut pocket 30 is formed with a back opening 40 into which both ends in the Y direction of this body part 60 are fitted. The body part 60 is fitted into this back opening 40, so that rotation of the nut 16 around the axis is restricted.

However, in the example illustrated in FIG. 12, a surface facing the base part 20 in a back wall 32 of the nut pocket 30 is a vertical surface orthogonal to the axial direction. This surface facing the base part 20, and the back surface of the flange part 62, are not close to each other, and a relatively large space exists between both parts.

In such a configuration, as illustrated in FIG. 13, when a fastening bolt 14 is inserted into the nut 16 housed in the nut pocket 30, the fastening bolt 14 abuts on the vicinity of an upper end of a female screw part 66, and force of pressing in the axial direction acts on the vicinity of the upper end of the female screw part 66. When the nut 16 receives this force, the upper side of the nut is inclined so as to fall rearward. At this time, a relatively large space is opened between the back wall 32 of the nut pocket 30 and the flange part 62, and therefore the nut 16 is largely inclined until the flange part 62 abuts on the back wall 32. As a result, the axis of the nut 16 is largely inclined to the axis of the fastening bolt 14, and meshing of a thread of the nut 16 with a thread of the fastening bolt 14 becomes difficult.

Such a problem can be solved by making the back wall 32 close to the flange part 62. However, even when the back wall 32 is made close to the flange part 62, in a case where the back wall 32 is substantially orthogonal to the axial direction, the nut 16 is unlikely to be guided to the coaxial position with the fastening bolt 14. That is, in a case where the fastening bolt 14 presses against the nut 16 in the axial direction, the flange part 62 is pressed against the back wall 32 in the axial direction. However, in a case where the back wall 32 is orthogonal to the axial direction, force of pressing this flange part 62 in the axial direction is not converted into force of moving along the surface of a target member 10, and force of moving the nut 16 along the surface of the target member 10 is not generated. Therefore, in a mode having no gradient surface illustrated in FIG. 12 and FIG. 13, force of guiding the nut 16 to the coaxial position with the fastening bolt 14 is likely to be reduced compared to a mode having the gradient surfaces, and therefore large force needs to be applied in the axial direction in order to attain positioning of the two.

On the other hand, as illustrated in FIG. 1 to FIG. 4, in a case where the nut 16 and the nut pocket 30 are provided with the gradient surfaces that are close to each other, falling of the nut 16 is unlikely to occur, and the force of pressing in the axial direction is likely to be converted into the force of moving along the surface of the target member 10, As a result, the nut 16 can be guided to the coaxial position with the fastening bolt 14 by even a relatively small force, and fastening work can be facilitated.

As is clear from the above description, according to the fastening structure disclosed in this specification, the nut 16 can be easily guided to the coaxial position with the fastening bolt 14, and fastening work can be facilitated. The configuration described above is an example, and a different configuration may be appropriately employed as needed.

Figure 8:
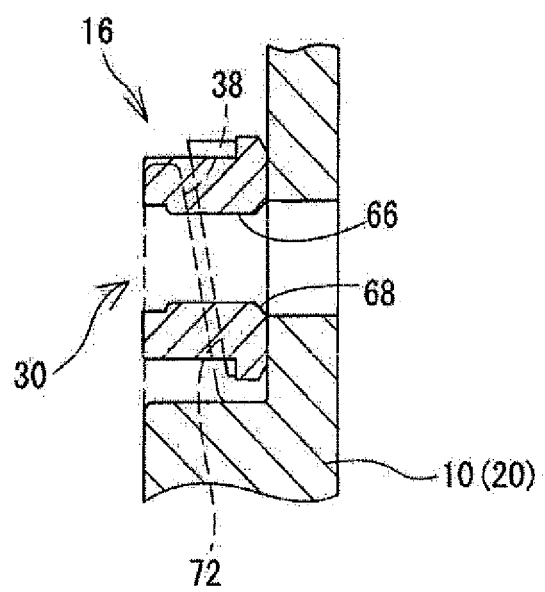
FIG. 8 is a sectional view illustrating another example of the nut and the nut pocket.
Figure 9:
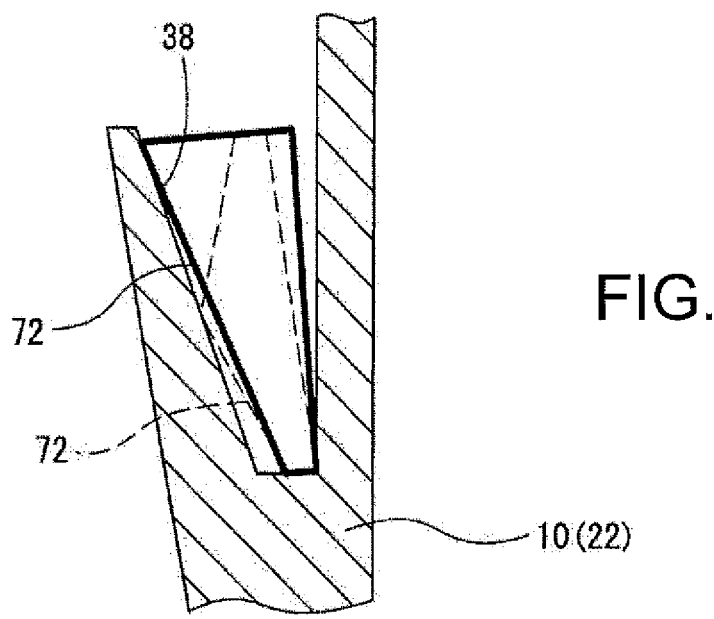
FIG. 9 is a diagram for illustrating the difference of the swing angle of the nut due to the difference of a distance of a surface to be abutted.

For example, in the above description, the shape of the nut 16 is the 180-degree rotationally symmetric shape. However, the nut 16 may not always have the 180-degree rotationally symmetric shape. For example, as illustrated in FIG. 8, each of the side parts 64 does not have a crest shape, but may have a shape in which the height in the X direction increases toward the upper end of the nut 16. In a case of such a configuration, the inclination of the nut 16 can be reduced, and screwing work of the nut 16 and the fastening bolt 14 can be facilitated. That is, in a case where each side part 64 of the nut 16 has the shape where the height in the X direction increases toward the upper end of the nut 16, abutting distances between the abutting surfaces 38 and the surfaces 72 to be abutted increase. In a case where the surfaces 72 to be abutted are long, as illustrated by a thick solid line in FIG. 9, the swing angle of the nut 16 until the nut abuts on each abutting surface 38 is reduced compared to a case where the surfaces 72 to be abutted are short (broken line). As a result, the surfaces 72 to be abutted are made long, the inclination of the nut 16 can be reduced, and fastening work can be facilitated.

Figure 10A:
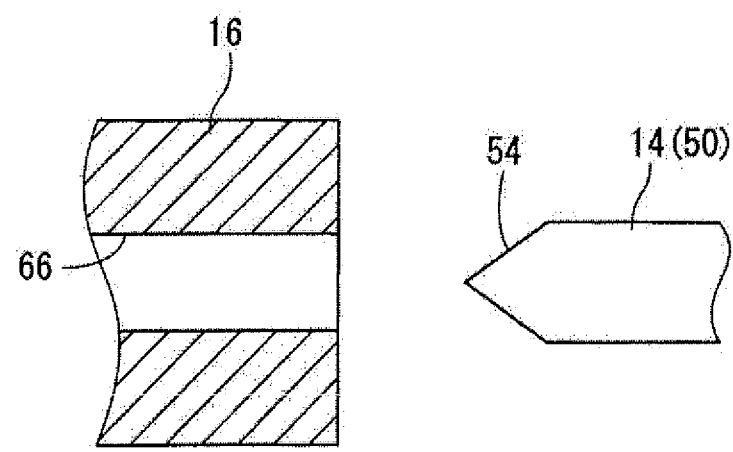
FIG. 10A is a diagram illustrating another example of a male screw part and a female screw part.
Figure 10B:
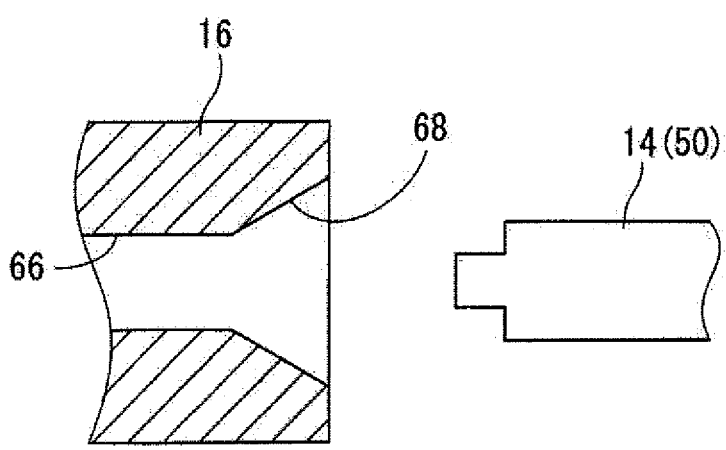
FIG. 10B is a diagram illustrating another example of the male screw part and the female screw part.
Figure 10C:
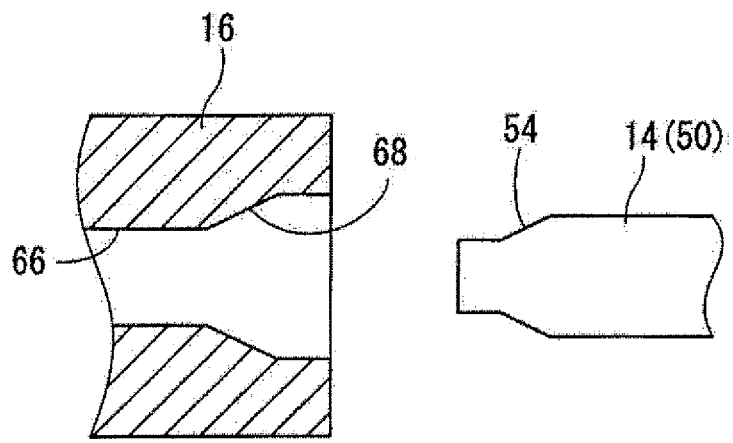
FIG. 10C is a diagram illustrating another example of the male screw part and the female screw part.

In the above description, the male screw part 50 of the fastening bolt 14 and the female screw part 66 of the nut 16 are provided with the tapered surfaces 54, 68, respectively. However, the tapered surface may be provided in at least one of the female screw part 66 and the male screw part 50. Therefore, for example, as illustrated in FIG. 10A, while the distal end of the male screw part 50 has a substantially conical shape, the tapered surface of the female screw part 66 may be omitted. As another mode, as illustrated in FIG. 10B, while a tapered surface 68 is provided in the proximal end of the female screw part 66, the tapered surface of the male screw part 50 may be omitted. However, also in this case, the distal end of the male screw part 50 preferably has a sufficiently smaller diameter than the inner diameter of the female screw part 66, and therefore the male screw part 50 may have a stepped shape having a gradually decreased diameter at the vicinity of the distal end. As illustrated in FIG. 10C, when the tapered surfaces 54, 68 are provided in the vicinity of the distal end of the male screw part 50 and in the vicinity of the proximal end of the female screw part 66, the tapered surfaces may be provided at portions slightly apart from the proximal end of the female screw part 66, and the distal end of the male screw part 50.

Figure 11:
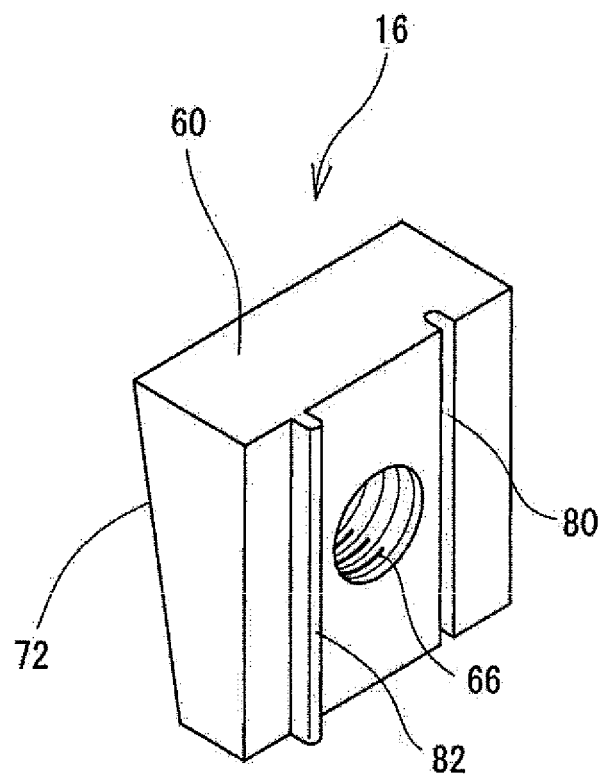
FIG. 11 is a perspective view illustrating another example of the nut.

In the above description, the end surfaces on both sides in the Y direction of the body part 60 of the nut 16 are used as the rotation restricting parts 42. However, each rotation restricting part 42 may have another mode, as long as the nut 16 abuts on a part of the nut pocket 30 when the nut 16 tries to rotate around the axis. For example, as illustrated in FIG. 11, a groove 80 or a rib 82 extending in the Z direction is formed as a rotation restricting part in a surface of the proximal end surface of the nut 16, and furthermore a rib or a groove engaged with this groove 80 or rib 82 may be formed as a restricted part in the base part 20. As another aspect, one of the rotation restricting parts 42 and the restricted parts 70 may be used as a pin protruding in the axial direction, and the other may be a groove allowing the pin to be fitted and extending in the Y direction.

The shapes of the nut 16 and the nut pocket 30 may be appropriately changed. Therefore, the nut 16 may have a substantially rectangular shape in front view, as illustrated in FIG. 11. The nut 16 may have a hexagonal shape, a circular shape, or an elliptical shape in front view. Any gradient surface may be provided in the back surface of the nut 16, as long as it functions as the abutting surfaces 38.

The shape of the nut pocket 30 may be appropriately changed so as to match the shape of the nut 16. For example, in a case where the nut 16 has a shape as illustrated in FIG. 11, the nut pocket 30 may have a shape without a back opening 40. However, the back opening 40 functions as a drain port for discharging liquid entering the nut pocket 30, or an access port that allows access to the nut 16 in the nut pocket 30. That is, the target member 10 and the member 12 to be fastened are sometimes disposed in an environment where liquid is generated, for example, an outdoor environment exposed to rain, or the like, depending on the type of the target member 10 and the member 12 to be fastened. In this case, when the back opening 40 does not exist, liquid is accumulated in the nut pocket 30. On the other hand, in a case where the back opening 40 is provided, the liquid in the nut pocket 30 is easily discharged outside through the back opening 40. In order to reliably discharge the liquid, the back opening 40 preferably extends up to the vicinity of the bottom surface of the nut pocket 30.

In a case where the back opening 40 does not exist, it is difficult for a worker to get access into the nut pocket 30. Therefore, in a case where the back opening 40 does not exist, it is difficult for the nut 16 that is erroneously loaded to be removed, and for the posture of the nut 16 to be adjusted, or foreign matter in the housing space to be taken out. On the other hand, when the back opening 40 is provided in the back wall 32 of the nut pocket 30, the access into the nut pocket 30 is facilitated, and therefore the removal of the nut 16, the adjustment of the posture of the nut 16, the removal of a foreign matter, or the like is facilitated.

REFERENCE SIGNS LIST 10 target member, 12 member to be fastened, 14 fastening bolt, 16 nut, 18 first fastening hole, 20 base part, 22 second fastening hole, 30 nut pocket, 32 back wall, 34 side wall, 36 bottom surface, 38 abutting surface, 40 back opening, 42 rotation restricting part, 50 male screw part, 52 head, 54 bolt-side tapered surface, 60 body part, 62 flange part, 64 side part, 66 female screw part, 68 nut-side tapered surface, 70 restricted part, 72 surface to be abutted, 80 groove, 82 rib

The invention claimed is:

1. A fastening structure for fastening a member to be fastened to a target member by use of a fastening bolt and a nut, the fastening structure comprising:
   the member to be fastened;
   the target member;
   the fastening bolt; and
   the nut, wherein
   the member to be fastened has a first fastening hole that penetrates in a prescribed axial direction so as to allow the fastening bolt to be inserted,
   the target member has a second fastening hole that penetrates in the axial direction so as to allow the fastening bolt to be inserted, and a nut pocket that communicates with the second fastening hole, and has an open end in a first direction substantially orthogonal to the axial direction and directing upward,
   the member to be fastened is fastened to the target member by insertion of the fastening bolt into the first and second fastening holes, and screwing and tightening of the nut housed in the nut pocket,
   at least one of a distal end part of a male screw part of the fastening bolt, and a proximal end part of a female screw part of the nut are formed with a tapered surface that guides the nut to a coaxial position with the fastening bolt,
   the nut pocket is formed with:
   a rotation restricting part that restricts rotation of the nut around the axis while allowing movement of the nut in the first direction by engagement with a part of the nut; and
   an abutting surface that is an abutting surface which abuts on another part of the nut, and is a gradient surface which proceeds in the axial direction as well as in the first direction, and
   the nut is formed with:
   a female screw part that is screwed with the fastening bolt;
   a restricted part that engages with the rotation restricting part; and
   a surface to be abutted that abuts on the abutting surface, and is a gradient surface substantially parallel to the abutting surface.

2. The fastening structure according to claim 1, wherein the nut is made of a material of a kind different from the target member.

3. The fastening structure according to claim 1, wherein the nut has a 180-degree rotationally symmetric shape with a central axis of the nut as a center.

4. The fastening structure according to claim 1, wherein an opening formed in an end in the first direction in the nut pocket is located on an upper side in a gravity direction with respect to a bottom surface of the nut pocket.

5. The fastening structure according to claim 1, wherein the nut pocket has a back wall facing a base part formed with the second fastening hole, and
the back wall is formed with a back opening that is a hole or a cutout communicated with an internal space of the nut pocket.

6. The fastening structure according to claim 5, wherein the back opening extends up to the bottom surface of the nut pocket.

7. The fastening structure according to claim 5, wherein the nut has a body part having a constant width in a second direction orthogonal to the first direction and the axial direction, and having both end surfaces in the second direction each functioning as the restricted part, and
the back opening has a width in the second direction that is almost the same as, or slightly larger than, the body part, and functions as the rotation restricting part.

8. The fastening structure according to claim 5, wherein a surface facing the base part in the back wall of the nut pocket is a gradient surface having a distance to the base part which increases toward the end in the first direction, and functions as the abutting surface, and
a part of a distal end surface of the nut is a gradient surface having a distance to the base part which increases toward the end in the first direction, and functions as the surface to be abutted.

* * * * *